US012611619B2

(12) United States Patent
Moravec et al.

(10) Patent No.: US 12,611,619 B2
(45) Date of Patent: Apr. 28, 2026

(54) HYDRODYNAMIC SEPARATOR WITH OPTIMAL MICROCHANNEL LENGTH

(71) Applicant: Donaldson Company, Inc., Bloomington, MN (US)

(72) Inventors: Davis B. Moravec, Bloomington, MN (US); Daryl L. Quam, Bloomington, MN (US)

(73) Assignee: Donaldson Company, Inc., Bloomington, MN (US)

( * ) Notice: Subject to any disclaimer, the term of this patent is extended or adjusted under 35 U.S.C. 154(b) by 329 days.

(21) Appl. No.: 18/038,582

(22) PCT Filed: Nov. 24, 2021

(86) PCT No.: PCT/US2021/060842
§ 371 (c)(1),
(2) Date: May 24, 2023

(87) PCT Pub. No.: WO2022/115619
PCT Pub. Date: Jun. 2, 2022

(65) Prior Publication Data
US 2024/0001263 A1    Jan. 4, 2024

Related U.S. Application Data

(60) Provisional application No. 63/118,472, filed on Nov. 25, 2020.

(51) Int. Cl.
B01D 21/00 (2006.01)
B01D 21/26 (2006.01)

(52) U.S. Cl.
CPC ....... B01D 21/0087 (2013.01); B01D 21/265 (2013.01)

(58) Field of Classification Search
CPC .......................... B01D 21/0087; B01D 21/265
See application file for complete search history.

(56) References Cited

U.S. PATENT DOCUMENTS 8,186,913 B2    5/2012  Toner et al.
8,208,138 B2    6/2012  Papautsky et al.
(Continued)

FOREIGN PATENT DOCUMENTS

EP        2381238 A1    10/2011
WO    2019232305 A1    12/2019
(Continued)

OTHER PUBLICATIONS

Amini et al., "Inertial microfluidic physics," Lab on a Chip, Jan. 1, 2014, vol. 14, No. 15, pp. 2739-2761.
(Continued)

*Primary Examiner* — Bradley R Spies
(74) *Attorney, Agent, or Firm* — Mueting Raasch Group

(57) ABSTRACT

A hydrodynamic separator is configured to separate a liquid having dispersed particles. The separator has a substrate and a liquid channel defined by the substrate, where the liquid channel is configured to receive a liquid having a Reynolds number (Re) within the channel. The liquid channel has an inlet and an outlet and is curved to define an inner radius ($R_C$). The liquid channel has a liquid channel length ($L_D$) along the curve and a rectangular cross-section along the length of the curve, where the rectangular cross-section has a height, a width (w), and a hydraulic diameter ($D_H$). The liquid channel length ($L_D$) is greater than or equal to a linear focusing length ($L_f$), and (Continued)

$$L_f = 1598.8 \frac{R_c \alpha w^2}{Re D_H^3} + 6.4,$$

where a is the particle diameter. The liquid channel length $(L_D)$ is greater than or equal to a linear focusing length (Lf), and $$L_f = 156.2 \frac{R_c}{Re} \left(\frac{w}{D_H}\right)^2 + 24.3.$$

In various embodiments the liquid channel length $(L_D)$ is greater than or equal to a linear focusing length $(L_f)$, and $$L_f = \frac{Re w^2}{8 D_H} + 24.3.$$

15 Claims, 6 Drawing Sheets

(56) References Cited

U.S. PATENT DOCUMENTS

| | | | |
|---|---|---|---|
| 8,226,332 B2 | 7/2012 | Kojima et al. | |
| 8,276,760 B2 | 10/2012 | Lean et al. | |
| 8,693,762 B2 | 4/2014 | Di Carlo et al. | |
| 8,784,012 B2 | 7/2014 | Toner et al. | |
| 8,807,879 B2 | 8/2014 | Toner et al. | |
| 8,931,644 B2 | 1/2015 | Lean et al. | |
| 9,090,865 B2 | 7/2015 | Di Carlo et al. | |
| 9,133,499 B2 | 9/2015 | Di Carlo et al. | |
| 9,347,595 B2 | 5/2016 | Toner et al. | |
| 9,433,880 B2 | 9/2016 | Lean et al. | |
| 9,458,489 B2 | 10/2016 | Lim et al. | |
| 9,644,229 B2 | 5/2017 | Brubacher | |
| 9,645,149 B2 | 5/2017 | Nagrath et al. | |
| 9,789,485 B2 | 10/2017 | Han et al. | |
| 9,797,791 B2 | 10/2017 | Vogt et al. | |
| 9,804,068 B2 | 10/2017 | Burke et al. | |
| 9,808,803 B2 | 11/2017 | Toner et al. | |
| 9,841,331 B2 | 12/2017 | Wood et al. | |
| 9,949,679 B2 | 4/2018 | Renlund | |
| 9,987,632 B2 | 6/2018 | Papautsky et al. | |
| 10,047,344 B2 | 8/2018 | Poon et al. | |
| 10,052,571 B2 | 8/2018 | Lean et al. | |
| 10,073,024 B2 | 9/2018 | Nagrath et al. | |
| 10,077,462 B2 | 9/2018 | Hou et al. | |
| 10,130,946 B2 | 11/2018 | Nagrath et al. | |
| 10,144,009 B2 | 12/2018 | Bhagat et al. | |
| 10,238,995 B2 | 3/2019 | Volkel et al. | |
| 2009/0014360 A1 * | 1/2009 | Toner | C12M 23/16 |
| | | | 209/208 |
| 2013/0130226 A1 | 5/2013 | Lim et al. | |
| 2017/0292104 A1 | 10/2017 | Ebrahimi Warkiani et al. | |
| 2018/0369817 A1 | 12/2018 | Rezai et al. | |
| 2021/0087521 A1 | 3/2021 | Ikeda et al. | |
| 2021/0223154 A1 | 7/2021 | Moravec et al. | |
| 2022/0395768 A1 | 12/2022 | Moravec et al. | |
| 2023/0356116 A1 | 11/2023 | Moravec et al. | |
| 2023/0390769 A1 | 12/2023 | Nelson et al. | |
| 2024/0326051 A1 | 10/2024 | Nelson et al. | |

FOREIGN PATENT DOCUMENTS

| | | | |
|---|---|---|---|
| WO | 2021108692 A1 | 6/2021 | |
| WO | 2022115619 A1 | 6/2022 | |
| WO | 2022256537 A1 | 12/2022 | |
| WO | 2023/235396 A1 | 12/2023 | |
| WO | 2024/206818 A1 | 10/2024 | |

OTHER PUBLICATIONS

Asghari et al., "Tape'n roll inertial microfluidics," Sensors and Actuators A: Physical, 2019, vol. 299, No. 111630, pp. 1-9.

Asmolov, E., "The inertial lift on a spherical particle in a plane Poiseuille flow at large channel Reynolds number," Journal of Fluid Mechanics, Feb. 1999, vol. 381, pp. 63-87.

Beech et al., "Tipping the balance of deterministic lateral displacement devices using dielectrophoresis," Lab on a Chip, 2009, vol. 9, No. 18, pp. 2698-2706.

Dean, W., "XVI. Note on the motion of fluid in a curved pipe," The London, Edinburgh, and Dublin Philosophical Magazine and Journal of Science, Jul. 1, 1927, vol. 4, No. 20, pp. 208-223.

Di Carlo et al., "Continuous inertial focusing, ordering, and separation of particles in microchannels," PNAS USA, Nov. 27, 2007, vol. 104, No. 48, pp. 18892-18897.

Di Carlo et al., "Equilibrium Separation and Filtration of Particles Using Differential Inertial Focusing," Analytical Chemistry, Mar. 15, 2008, vol. 80, No. 6, pp. 2204-2211.

Di Carlo, D., "Inertial Microfluidics," Lab on a Chip, 2009, vol. 9, No. 21, pp. 3038-3046.

Gossett et al., "Particle focusing mechanisms in curving confined flows," Analytical chemistry, Oct. 15, 2009, vol. 81, No. 20, pp. 8459-8465.

Holm et al., "Separation of parasites from human blood using deterministic lateral displacement," Lab on a Chip, 2011, vol. 11, No. 7, pp. 1326-1332.

International Preliminary Report on Patentability for PCT/US2021/060842, issued May 30, 2023, 8 pages.

International Search Report and Written Opinion for PCT/US2021/060842, issued Mar. 16, 2022, 11 pages.

Johnston et al., "Dean flow focusing and separation of small microspheres within a narrow size range," Microfluidics and Nanofluidics, Jan. 23, 2014, vol. 17, pp. 509-518.

Kuntaegowdanahalli et al., "Inertial microfluidics for continuous particle separation in spiral microchannels," Lab on a Chip, 2009, vol. 9, No. 20, pp. 2973-2980.

Lancaster, et al. (PARC, Inc.), "Hydrodynamic Separation of Neutrally Buoyant Particles From Wastewater: Reducing Energy Demands and Increasing Energy Yields," California Energy Commission. Mar. 2015, Publication No. CEC-500-2016-025, 96 pages.

Lee et al., "Inertial focusing of particles with an aerodynamic lens in the atmospheric pressure range," Journal of Aerosol Science, 2003, vol. 34, No. 2, pp. 211-224.

Nivedita, et al., "Use of Secondary Dean Vortices in Spiral Microchannels for Cell Separations," 18th International Conference on Miniaturized Systems for Chemistry and Life Sciences, Oct. 26-30, 2014, San Antonio, Texas, USA, pp. 2483-2485.

Nugen et al. "PMMA biosensor for nucleic acids with integrated mixer and electrochemical detection," Biosensors and Bioelectronics, 2009, vol. 24, No. 8, pp. 2428-2433.

Russom et al., "Differential inertial focusing of particles in curved low-aspect-ratio microchannels," New Journal of Physics, Jul. 31, 2009, vol. 11, No. 075025, pp. 1-9.

Völkel et al., "Innovative Technology for Selective Contaminant Removal," NSTI-Nanotech 2011, 2011, vol. 3, pp. 581-584.

Wang et al., "A low-cost, plug-and-play inertial microfluidic helical capillary device for high-throughput flow cytometry," Biomicrofluidics, 2017, vol. 11, No. 014107, pp. 1-11.

Warkiani et al., "Membrane-less microfiltration using inertial microfluidics," Scientific Reports, Jul. 8, 2015, vol. 5, No. 11018, pp. 1-10.

Wu et al., "Microfluidic hydrodynamic cell separation: a review," Micro and Nanosystems, Nov. 1, 2009, vol. 1, No. 3, pp. 1-12.

Xu et al., "Detection of Cryptosporidium parvum in buffer and in complex matrix using PEMC sensors at 5 oocysts mL-1," Analytica Chimica Acta, 2010, vol. 669, No. 1-2, pp. 81-86.

(56) References Cited

OTHER PUBLICATIONS

Zheng et al., "The influence of Saffman lift force on nanoparticle concentration distribution near a wall," Applied Physics Letters, 2009, vol. 95, No. 124105, pp. 1-4.

Zhou et al., "Fundamentals of inertial focusing in microchannels," Lab on a Chip, 2013, vol. 13, No. 6, pp. 1121-1132.

International Search Report and Written Opinion for International Application No. PCT/US2023/024006, mailed Sep. 14, 2023, 09 Pages.

International Preliminary Report on Patentability for International Application No. PCT/US2023/024006, dated Nov. 7, 2024, 06 Pages.

* cited by examiner

HYDRODYNAMIC SEPARATOR WITH OPTIMAL MICROCHANNEL LENGTH

This application is the § 371 U.S. National Stage of International Application No. PCT/US2021/060842, filed 24 Nov. 2021, which claims the benefit of U.S. Provisional Application No. 63/118,472, filed 25 Nov. 2020, the disclosures of which are incorporated by reference herein in their entireties.

TECHNOLOGICAL FIELD

The present disclosure is generally related to hydrodynamic separators. More particularly, the present disclosure is related to hydrodynamic separators with optimal microchannel length.

BACKGROUND

Hydrodynamic separators are used in a variety of industries for concentration and/or separation of particles in fluid streams such as hydrocarbon liquids, beverages, aqueous solutions, and the like. Particles suspended in the fluid may cause problems in system processes (such as, for example, in fuel or hydraulic systems), may generally be undesirable to consumers (for example, pulp in orange juice or impurities in beer or wine), or may be subject to different processing steps than the fluid (such as in sewage treatment). It can be desirable to design such hydrodynamic separators to achieve proper particle separation with minimal pressure drop to improve particle separation and efficiency in terms of both energy expenditure and time.

SUMMARY

Some embodiments of the technology disclosed herein relates to a hydrodynamic separator. The hydrodynamic separator is configured to separate a liquid having dispersed particles having a diameter (a). The hydrodynamic separator has a substrate and a liquid channel defined by the substrate. The liquid channel has an inlet and an outlet. The liquid channel is configured to receive a liquid having a Reynolds number (Re) within the channel. The liquid channel is curved to define an inner radius ($R_C$) and has a liquid channel length ($L_D$) along the curve. The liquid channel has a rectangular cross-section along the length of the curve, and the rectangular cross-section has a height, a width (w), and a hydraulic diameter ($D_H$). The liquid channel length ($L_D$) is greater than or equal to a linear focusing length ($L_f$), where $$L_f = 1598.8 \frac{R_c a w^2}{Re D_H^3} + 6.4.$$

In various embodiments, such a system is configured to have a Dean Number (De) between 5 and 25. Additionally or alternatively, the particle diameter (a) is greater than 8% of the hydraulic diameter ($D_H$). Additionally or alternatively, the liquid channel length ($L_D$) is no greater than 40% more than the linear focusing length ($L_f$). Additionally or alternatively, the liquid channel length ($L_D$) is no greater than 30% more than the linear focusing length ($L_f$). Additionally or alternatively, the particles are up to three times as dense as the liquid. Additionally or alternatively, the outlet comprises a first outlet and a second outlet. Additionally or alternatively, the liquid channel is one of a plurality of identical liquid channels. Additionally or alternatively, the liquid channel has a first region having a first channel width and a second region having a second channel width, and a tapered region extending from the first channel width to the second channel width.

Some embodiments disclosed herein relate to a hydrodynamic separator configured to separate a liquid having dispersed particles. The hydrodynamic separator has a substrate and a liquid channel defined by the substrate, where the liquid channel has an inlet and an outlet. The liquid channel is configured to receive a liquid having a Reynolds number (Re) within the channel. The liquid channel is curved to define an inner radius ($R_C$) and has a liquid channel length ($L_D$) along the curve. The liquid channel has a rectangular cross-section along the length of the curve, where the rectangular cross-section has a height, a width (w), and a hydraulic diameter ($D_H$). The liquid channel length ($L_D$) is greater than or equal to a linear focusing length ($L_f$), where $$L_f = 156.2 \frac{R_c}{Re} \left( \frac{w}{D_H} \right)^2 + 24.3.$$

In various embodiments, such a system is configured to have a Dean Number (De) between 5 and 25. Additionally or alternatively, the particle diameter (a) is greater than 8% of the hydraulic diameter ($D_H$). Additionally or alternatively, the liquid channel length ($L_D$) is no greater than 40% more than the linear focusing length ($L_f$). Additionally or alternatively, the liquid channel length ($L_D$) is no greater than 30% more than the linear focusing length ($L_f$). Additionally or alternatively, the particles are up to three times as dense as the liquid. Additionally or alternatively, the outlet comprises a first outlet and a second outlet. Additionally or alternatively, the liquid channel is one of a plurality of identical liquid channels. Additionally or alternatively, the liquid channel has a first region having a first channel width and a second region having a second channel width, and a tapered region extending from the first channel width to the second channel width.

Some embodiments relate to a hydrodynamic separator configured to separate a liquid having dispersed particles having a diameter (a). The hydrodynamic separator has a substrate and a liquid channel defined by the substrate, where the liquid channel is configured to receive a liquid having a Reynolds number (Re) within the channel. The liquid channel has an inlet and an outlet, and the liquid channel is curved to define an inner radius ($R_C$) and has a liquid channel length ($L_D$) along the curve. The liquid channel has a rectangular cross-section along the length of the curve. The rectangular cross-section has a height, a width (w), and a hydraulic diameter ($D_H$). The liquid channel length ($L_D$) is greater than or equal to a linear focusing length ($L_f$), and $$L_f = \frac{Re w^2}{8 D_H} + 24.3.$$

In various embodiments, such a system is configured to have a Dean Number (De) between 5 and 25. Additionally or alternatively, the particle diameter (a) is greater than 8% of the hydraulic diameter ($D_H$). Additionally or alternatively, the liquid channel length ($L_D$) is no greater than 40% more than the linear focusing length ($L_f$). Additionally or alternatively, the liquid channel length ($L_D$) is no greater than 30% more than the linear focusing length ($L_f$). Additionally or alternatively, the particles are up to three times as dense as the liquid. Additionally or alternatively, the outlet comprises a first outlet and a second outlet. Additionally or alternatively, the liquid channel is one of a plurality of identical liquid channels. Additionally or alternatively, the liquid channel has a first region having a first channel width and a second region having a second channel width, and a tapered region extending from the first channel width to the second channel width.

Some embodiments relate to a hydrodynamic separator configured to separate a liquid having dispersed particles having a particle diameter (a). The hydrodynamic separator has a substrate and a liquid channel defined by the substrate. The liquid channel is configured to receive a liquid having a Reynolds number (Re) within the channel and the liquid channel has an inlet and an outlet. The liquid channel is curved to define an inner radius ($R_C$) and has a liquid channel length ($L_D$) along the curve about a central axis. The liquid channel has a rectangular cross-section along the length of the curve, where the rectangular cross-section has a height, a width (w), and a hydraulic diameter ($D_H$). The liquid channel has a focusing angle ($\alpha$) about the central axis, where $$\alpha = 265{,}682 \frac{aw^2}{\pi Re D_H^3} + 45.1.$$

The liquid channel extends circumferentially about the central axis to an arc measure greater than or equal to the focusing angle $\alpha$.

In various embodiments, such a system is configured to have a Dean Number (De) between 5 and 25. Additionally or alternatively, the particle diameter (a) is greater than 8% of the hydraulic diameter ($D_H$). Additionally or alternatively, the arc measure is no greater than 40% more than the focusing angle. Additionally or alternatively, the arc measure is greater than 360 degrees, and the liquid channel defines a helix. Additionally or alternatively, the arc measure is less than 360 degrees. 12. Additionally or alternatively, the particles are up to three times as dense as the liquid. Additionally or alternatively, the outlet comprises a first outlet and a second outlet. Additionally or alternatively, the liquid channel is one of a plurality of identical liquid channels. Additionally or alternatively, the liquid channel has a first region having a first channel width and a second region having a second channel width, and a tapered region extending from the first channel width to the second channel width.

Some embodiments relate to a hydrodynamic separator configured to separate a liquid having dispersed particles having a diameter (a). The separator has a substrate and a liquid channel defined by the substrate. The liquid channel is configured to receive a liquid having a Reynolds number (Re) within the channel. The liquid channel has an inlet and an outlet. The liquid channel has a curved inner wall defining an inner radius ($R_C$) and a curved outer wall defining an outer radius. The liquid channel has a liquid channel length ($L_D$) along the curved inner wall. The liquid channel has a rectangular cross-section along the liquid channel length. The rectangular cross-section has a channel width (w) between the inner wall and outer wall, where the channel has a tapered region where the channel width tapers between the inlet and the outlet.

In some such embodiments, the channel width increases towards the outlet. Additionally or alternatively, the channel width increases at a constant rate between the inlet and the outlet. Additionally or alternatively, the channel width decreases towards the outlet. Additionally or alternatively, the inner radius is constant from the inlet to the outlet. Additionally or alternatively, the outer radius tapers outward between the inlet and the outlet. Additionally or alternatively, the liquid channel has: a first region having a first channel width and a first liquid channel length, a second region having a second channel width and a second liquid channel length, and the tapered region having a tapered region length that extends from the first region to the second region. In some such embodiments, the first region has a larger length than the second region.

Additionally or alternatively, the system is configured to have a Dean Number (De) between 5 and 25 in the first region and the second region. Additionally or alternatively, the particles are up to three times as dense as the liquid. Additionally or alternatively, the outlet has a first outlet and a second outlet. Additionally or alternatively, the liquid channel is one of a plurality of identical liquid channels. Additionally or alternatively, the particle diameter (a) is greater than 8% of the hydraulic diameter ($D_H$) of the first region and the hydraulic diameter of the second region.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

The present technology may be more completely understood and appreciated in consideration of the following detailed description of various embodiments in connection with the accompanying drawings.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION

Hydrodynamic separators are microfluidic devices capable of focusing particles within a fluid stream relying only on the forces due to internal fluid flow. The particles can be separated from a portion of the fluid steam and/or separated from particles of other sizes within the fluid stream. The hydrodynamic separator generally defines a fluid channel having an inlet and an outlet having at least two flow branches. Particles within a particular size range may be focused, or concentrated, into one of the two flow branches. For example, particles exceeding a threshold size range are focused into one of the two flow branches. The concentrated portion of the fluid flow may be removed from the system or retained for further processing. Any remaining particles may flow through the at least two flow branches.

Figure 1:
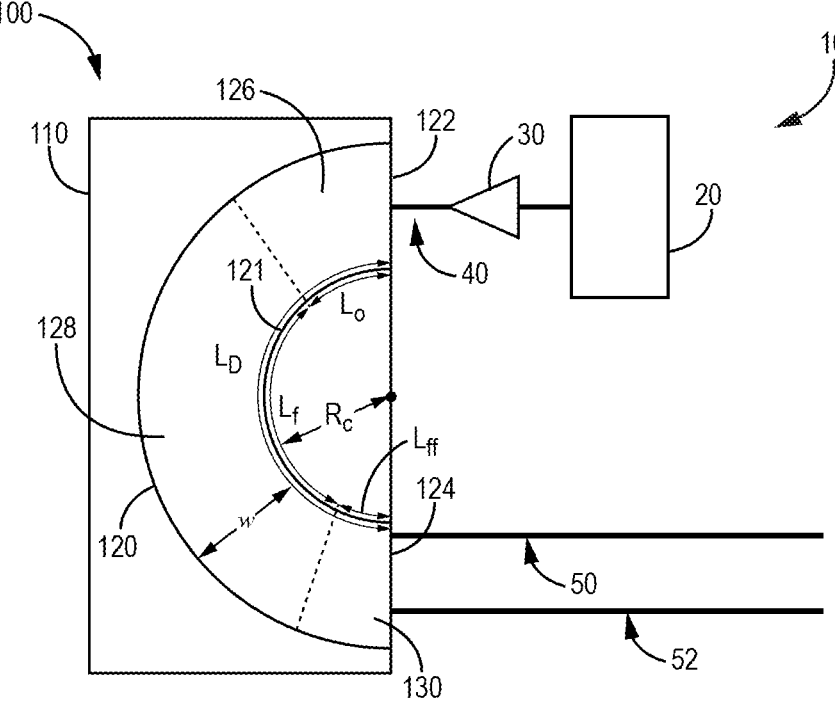
FIG. 1 is a schematic representation of an example hydrodynamic separator system consistent with embodiments.

FIG. 1 is a schematic representation of an example system 10 consistent with some implementations of the technology disclosed herein. The system 10 is a hydrodynamic separator system that is configured to focus particles that are suspended in a fluid stream. The system 10 has a hydrodynamic separator 100 having an inlet 122 and an outlet 124. A fluid pump 30 creates fluid communication between a fluid source 20 and the hydrodynamic separator 100. In particular, the fluid pump 30 is configured to pump fluid from the fluid source 20 through an inlet flow channel 40 to the inlet 122 of the hydrodynamic separator 100. The fluid is configured to flow through a liquid channel 120 of the hydrodynamic separator 100 to the outlet 124. A first outlet branch 50 and a second outlet branch 52 can lead from the outlet 124 to other systems or other system components. In some embodiments, fluid flowing through the first outlet branch 50 is configured to have a higher concentration of particles within a particular size range compared to fluid flowing through the second outlet branch 52.

The hydrodynamic separator consistent with the technology disclosed herein are generally constructed of a substrate 110. The substrate 110 defines the liquid channel 120 therein. The substrate can be constructed of a variety of different materials and combinations of materials. The substrate can be polymeric, in some embodiments. In some examples the substrate is polydimethylsiloxane (PDMS). In some embodiments the substrate can include glass. In some embodiments the substrate can include a non-reactive metal. In some embodiments the substrate can include one or more adhesive layers, such as a pressure-sensitive adhesive. In some embodiments the substrate may be two or more materials, such that the walls of the channels may be two or more materials.

The liquid channel 120 is generally configured to accommodate liquid flow. The liquid channel 120 defines the inlet 122 and the outlet 124. The liquid channel 120 defines a channel length $L_D$ from the inlet 122 to the outlet 124. The liquid channel 120 is generally curved to define an inner radius $R_C$ about a central axis x. As such, the liquid channel 120 extends circumferentially about the central axis x to define a channel arc measure. In the current example, the liquid channel 120 extends about 180° about the central axis x. In the current example, the inner radius $R_C$ is substantially constant along the length of the channel, but in some other examples, the inner radius $R_C$ can vary.

Figure 2:
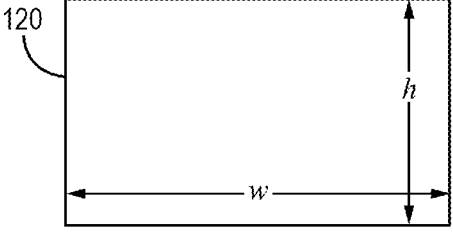
FIG. 2 is a cross-sectional view of the liquid channel of FIG. 1.

The liquid channel 120 generally has a rectangular cross-section along the channel length, which is visible in FIG. 2. The cross-section of the liquid channel 120 is generally perpendicular to the direction of fluid flow through the channel 120. The channel 120 has a height (h) that is visible in FIG. 2, and a width (w) that is visible in both FIGS. 1 and 2. The channel 120 also has a hydraulic diameter ($D_H$). The following equation is used to calculate the hydraulic diameter of a microfluidic channel having a rectangular cross-section:

$$D_H = \frac{2 \times \text{height} \times \text{width}}{\text{height} + \text{width}}$$

The liquid channel 120 can be formed in the substrate 110 through molding operations, photolithography, and 3D printing, as examples. In some examples, the liquid channel 120 is formed in the substrate 110 through injection molding or embossing of plastics. Other approaches can also be used to form the liquid channel 120. In various embodiments, the hydrodynamic separator 100 defines a plurality of liquid channels 120 that are configured to operate in parallel. In various embodiments, the hydrodynamic separator 100 has at least 10 liquid channels. In various embodiments, the hydrodynamic separator 100 has at least 50 liquid channels or at least 100 liquid channels.

In some embodiments where the hydrodynamic separator 100 has a plurality of liquid channels, one liquid channel 120 can be defined within a single a substrate layer. In some such embodiments, multiple substrate layers can be layered in a stacked configuration such that each of the plurality of liquid channels 120 defined by each substrate layer are also in a stacked configuration. The stacked layers of substrate and the liquid channels 120 to form the hydrodynamic separator 100. The hydrodynamic separator 100 can define the inlet flow channel 40 upstream of and in direct fluid communication with each of the microfluidic channel inlets (such as inlet 122). The inlet flow channel 40 will generally have a hydraulic diameter that is larger than the hydraulic diameter of each of the liquid channels 120. The hydrodynamic separator 100 can define the first outlet branch 50 and the second outlet branch 52 that are both positioned downstream of, and in direct fluid communication with, each the outlet 124. Each of the first outlet branch 50 and the second outlet branch 52 will generally have a diameter that is larger than the hydraulic diameter of each of the liquid channels. Such a configuration may advantageously equalize flow through the channels.

The liquid channel 120 is configured to receive a liquid having a Reynolds number (Re) within the liquid channel. The fluid flow within a curving channel is described by two non-dimensional numbers, the Reynolds number and the Dean Number. The Reynolds number describes the ratio of inertial forces to viscous forces, and is defined as:

$$Re = \frac{\rho U D_H}{\mu}$$

where ρ is the fluid density, U is the average fluid velocity, and μ is the dynamic viscosity of the fluid. In hydrodynamic separators the Reynolds number is typically small (<1000), which means that the flow profile is laminar. In various embodiments, the system is configured to have a Dean Number (De) between 5 and 25. In various embodiments, the system is configured to have a Dean Number between 5 and 20. The Dean number describes fluid behavior in a curved pipe and accounts for inertial forces, centripetal forces, and viscous forces acting on the fluid. The Dean number is defined as:

$$De = \text{Re}\sqrt{\frac{D_H}{2R_e}}$$

The hydrodynamic system 10 is generally configured to focus particles in the liquid channel 120. As used herein, the term "particle" refers to a discrete amount of material, which is dispersed in a fluid. Non-limiting examples of material that may be formed particles include dirt, metal, cells, air bubbles, fat, water droplets. In one particular example, water droplets may be dispersed in a hydrocarbon fluid, such as gasoline or diesel fuel, to form an emulsion. In another example, air bubbles may be dispersed in a hydraulic fluid. In another example, cells may be dispersed in an aqueous fluid. In yet other examples, particles may be pulp in orange juice, fat in milk, and impurities in beer or wine.

In various implementations, hydrodynamic separator 100 is configured to focus particles having a diameter of greater than 8% of the hydraulic diameter of the liquid channel 120. Particles whose diameter are greater than 8% of the channel hydraulic diameter are generally focused towards the inner wall when the Dean number ranges from 5 to 25. The hydrodynamic separator is generally configured to focus particles having a diameter that is less than or equal to 50% of the channel height. In various examples, for purposes of calculations provided herein, the particles have a sphericity of greater than 0.5. For non-spherical particles, for purposes of calculations provided herein, the particle diameter is considered to be the equivalent spherical diameter. In various embodiments, hydrodynamic separators consistent with the technology disclosed herein are configured to focus particles having a density up to three times as dense as the liquid in the liquid channel 120.

Particle focusing occurs in two distinct stages. The first stage is a particle migration stage where the suspended particles migrate from across the liquid channel 120 to the edges of the liquid channel 120. The particle migration stage generally starts at the liquid channel inlet 122 and extends a particle migration length $L_o$ of the liquid channel 120 to define the particle migration region 126 of the liquid channel 120. In this region no additional focusing on the inside wall 121 of the liquid channel 120 is observed. The second region is a linear focusing region 128 in which the amount of focusing on the inside wall 121 increases linearly along the channel length. The focusing continues until a maximum particle focusing is reached. No additional focusing is observed after maximum particle focusing is reached. Linear focusing region 128 has a linear focusing length $L_f$ that is the length necessary to achieve maximum particle focusing. The linear focusing region 128 generally extends from the particle migration region 126 towards the channel outlet 124.

The length of the liquid channel 120 after the linear focusing region 128 is referred to as the fully focused region 130. The fully focused region 130 has a length that extends from the linear focusing region 128 to the outlet 124. In various implementations it can be desirable to limit or eliminate the fully focused region 130 in order to decrease the energy requirements of the system by lowering the pressure drop across the liquid channel 120 while still achieving maximum particle focusing.

Figure 3:
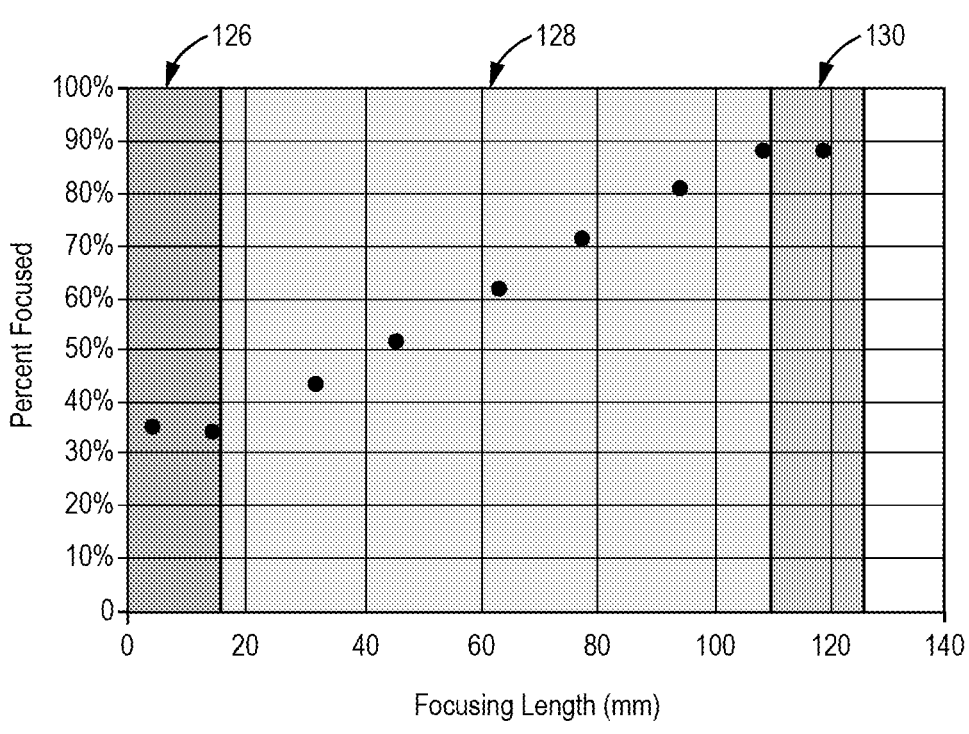
FIG. 3 is a plot representing particle focusing along the length of a liquid channel.

FIG. 3 is a graph depicting representative focusing behavior demonstrating the three stages of particle focusing along the length of a curved liquid channel. The particle migration region 126 accounts for approximately the first 16 mm of the length of the channel, and the linear focusing region 128 follows. In this example, the linear focusing region 128 achieves maximum particle focusing around 114 mm along the length of the liquid channel. Once the maximum value of particle focusing is reached, the particle focusing may stay approximately constant. This region of the device is considered the fully focused region 130. In this example, the maximum focusing percentage in the fully focused region shows is about 90% (that is, 90% of the particles are focused).

Mathematically, the length of the linear focusing region necessary to achieve maximum particle focusing in a curved channel (such as that depicted in FIG. 1) is a linear function based on the radial component of the particle velocity through the channel. According to existing literature (see, for example. Di Carlo, D., Irimia, D., Tompkins, R. G., Toner, M.; Continuous Inertial Focusing, Ordering, and Separation of Particles in Microchannels. Proceedings of the National Academy of Sciences of the U.S.A., November 2007. Vol. 104, No. 4, 18892-7), the magnitude of the radial component of the Dean Flow profile, or the linear focusing rate $U_D$, is the following:

$$U_D \sim \frac{De^2 \mu}{\rho D_H}$$

Figure 4:
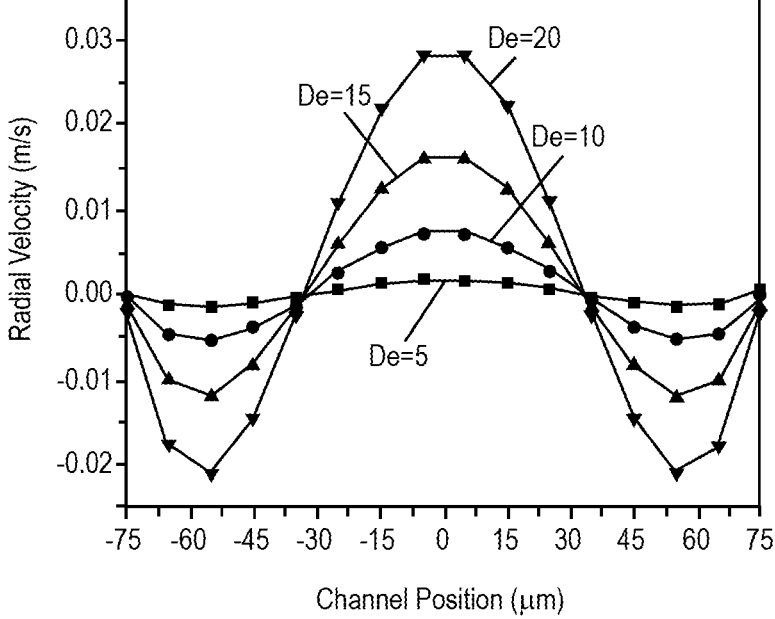
FIG. 4 is a plot of typical radial flow profiles for different Dean numbers consistent with a liquid channel.

This relationship was tested on rectangular channels using computational fluid dynamics in STAR-CCM+ software by Siemens PLM Software based in Plano, Texas. To measure the radial flow component, a function probe was inserted in the center of the virtual fluid domain, aligned with the depth of the channel (in the Z direction) at discrete radial positions along the primary fluid flow direction. An example series of typical radial flow profiles are shown in FIG. 4, where the radial velocity is a function of the depth through the center of the channel. The flow profiles shown are of a single device geometry and fluid combination across varying Dean numbers but with constant channel height h (150 μm), width w (500 μm), and inner radius $R_c$ (20 mm). In this coordinate system positive flow velocities indicate fluid is moving towards the outside wall of the device, while negative flow velocities indicate fluid is moving towards the inside wall of the device. At the center of the channel depth the maximum radial flow component is observed. This corresponds to the maximum velocity towards the outer wall due to fluid inertia. There are two minimum radial flow components, symmetrically observed above and below the center of the channel depth. These flow components are the recirculating flow towards the inside wall, which are ultimately responsible for passively moving particles to the final focusing position.

Figure 5:
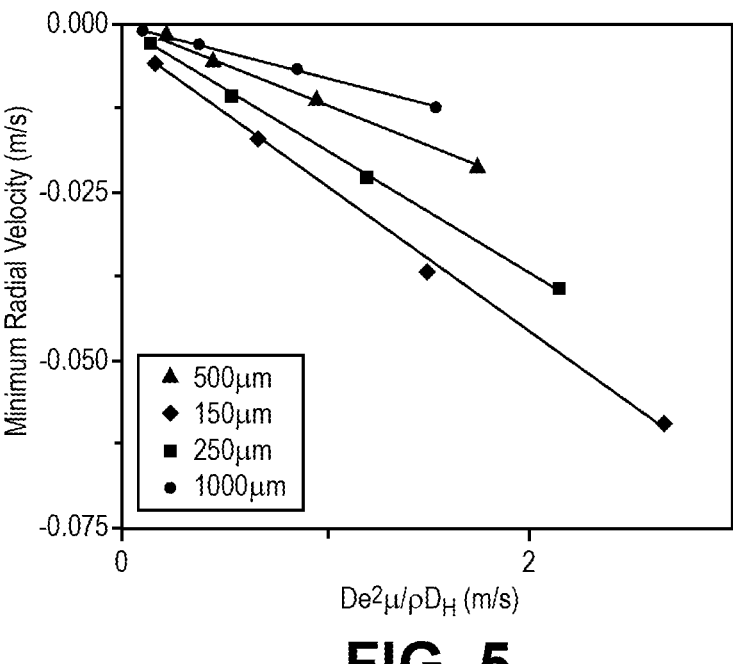
FIG. 5 is a plot of experimental results against a prior art equation defining radial flow velocity.

The minimum radial flow velocities for different liquid channel widths at four different Dean Numbers (De=5, 10, 15, 20) were plotted against the literature equation for the magnitude of the radial component of the Dean Flow profile, which is reflected in FIG. 5. As is visible, the equation does not define a linear relationship across different liquid channel widths and thus is not an accurate predictor of radial velocity. Over the course of further testing and analysis, the following relationship was discovered for the linear focusing rate $U_D$:

$$U_D \sim \frac{De^2 \mu}{\rho w}$$

Figure 6:
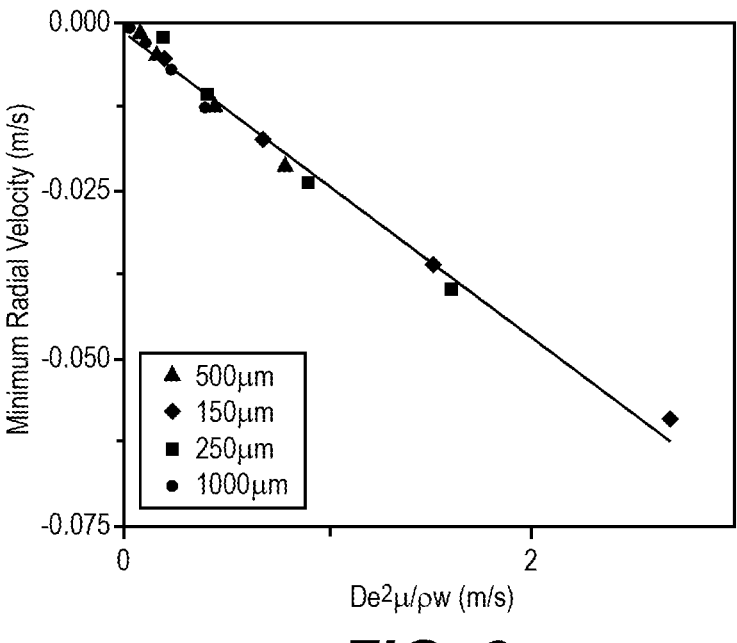
FIG. 6 is a plot of experimental results against a new equation defining radial flow velocity.

This equation was plotted against the minimum radial velocity and the results are reflected in FIG. 6. As is visible, the data from devices with different liquid channel widths collapse into a single linear curve. This relationship holds true when changing device geometry (width, height, and $R_c$) and fluid properties (viscosity and density) over the range of Dean numbers relevant to hydrodynamic separators ($5 < De < 25$). Specifically, the minimum radial velocity was found to be the following:

$$U_D = -0.02597 * \frac{De^2 \mu}{\rho w} - 1.107 * 10^{-4}$$

where $\mu$ is in cP, w is in microns, $\rho$ is g/cm³ and $U_D$ is in m/s.

Based on the minimum radial velocity, an equation to determine the length of the linear focusing region to obtain maximum particle focusing can be derived. The velocity across the width of the liquid channel is nearly constant, so the time it takes for a particle to transit the width of the liquid channel to the inner wall is:

$$t \propto \frac{w}{U_D} = \frac{w^2 \rho}{De^2 \mu}$$

As such, the length of the linear focusing region is:

$$L_f \propto tU = \frac{w^2 \rho}{De^2 \mu} U$$

where U is the average downstream velocity of the fluid. Substituting in $$U = \frac{Re \mu}{\rho D_H}$$

yields:

$$L_f \propto \frac{Re}{De^2} \frac{w^2}{D_H} = \frac{2R_c}{Re} \left( \frac{w}{D_H} \right)^2$$

and, more specifically, $$L_f = 156.2 \frac{R_c}{Re} \left( \frac{w}{D_H} \right)^2 + 24.3$$

Linear focusing region is generally shorter at a higher Dean number, and because the operative range for a hydrodynamic separator consistent with the technology disclosed herein is a Dean number ranging from 5 to 25, the linear focusing length $L_f$ will generally be a minimum of $$L_f = \frac{Re w^2}{8 D_H} + 24.3$$

Figure 7:
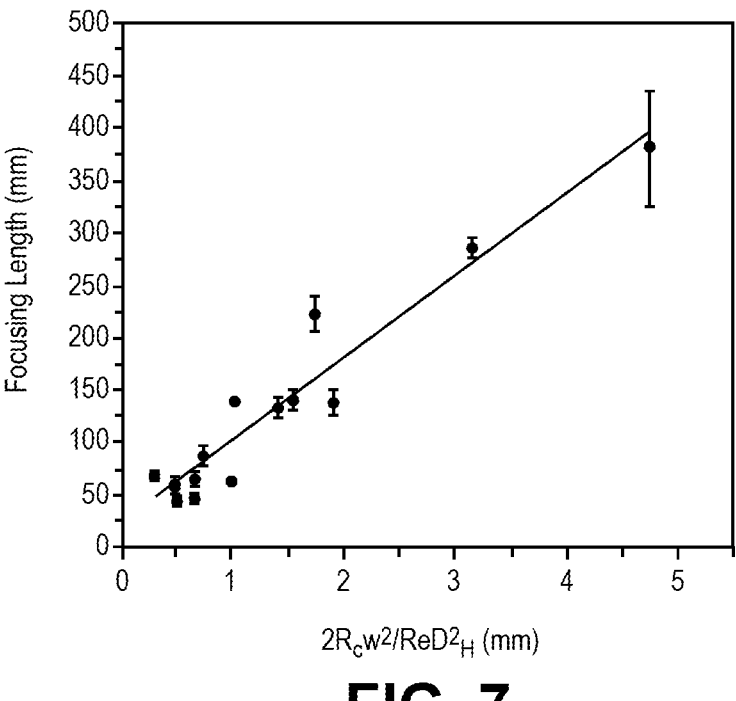
FIG. 7 is a plot of experimental results against a first equation defining particle focusing length.
Figure 8:
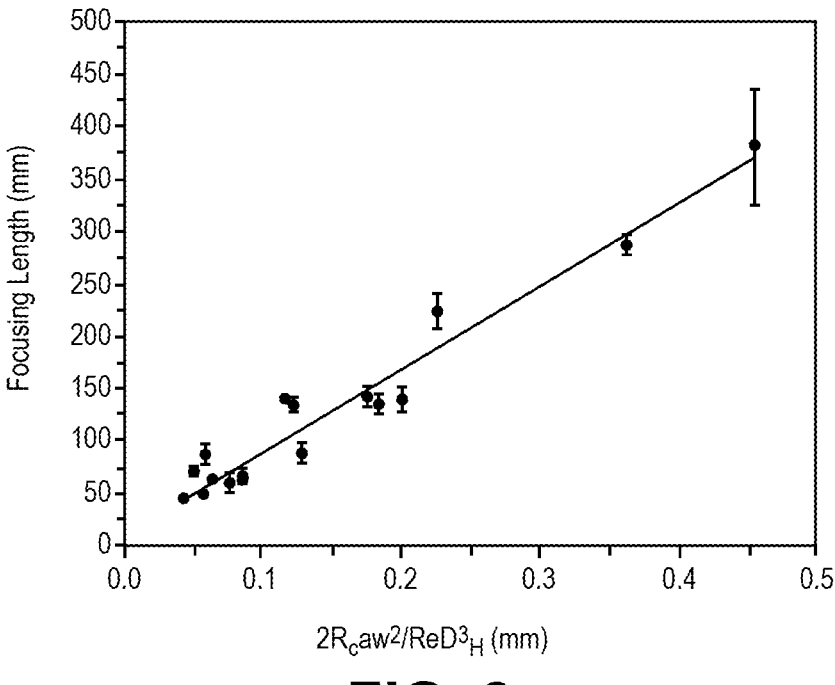
FIG. 8 is a plot of experimental results against a second equation defining particle focusing length, where the second equation takes particle size into account.

Using the particle focusing rate (i.e. the slope of the linear focusing region) the length required to focus an additional 80% of particles was calculated. An additional 80% of particles being focused would bring the focusing efficiency to greater than 90% because at the device inlet 10-20% of the particles are already in the focusing position. The observed focusing length associated with experimental results were plotted against the focusing length $L_f$ equation above, which is reflected in FIG. 7. Error bars correspond to the standard error based on the uncertainty in the slope of the linear focusing region. This fit shows a clear trend, which is dominated by changes in device width and radius of curvature. A closer look at the data suggests that the focusing length $L_f$ is dependent on particle size. Specifically, smaller particles focus faster than larger particles. Indeed, particles of different sizes will experience different lift forces, and thus transit the width of the device at different heights. It was discovered that taking the linear focusing length $L_f$ and multiplying it by the particle confinement ($a/D_h$) yields $$L_f \propto \frac{2R_c a w^2}{Re D_H^3}$$

and, more specifically, $$L_f = 1598.8 \frac{R_c a w^2}{Re D_H^3} + 6.4$$

which is plotted against the observed experimental focusing lengths as reflected in FIG. 8. The data collapsed onto a linear fit, giving an $R^2$ value of greater than 0.95.

Figures 9, 10:
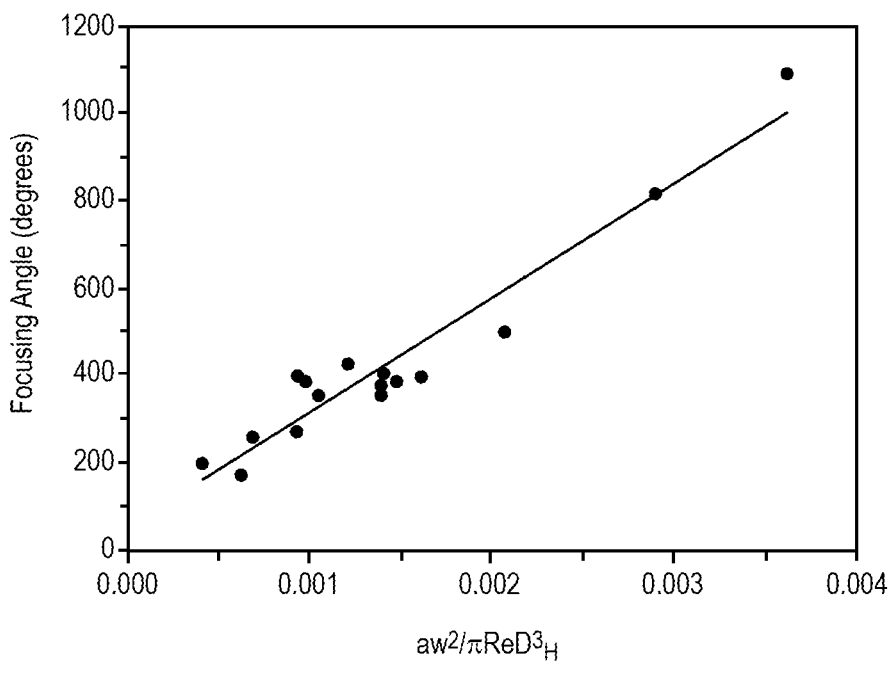
FIG. 9 is a plot of experimental results against a third equation defining the arc measure of the liquid channel.
FIG. 10 is a schematic diagram representing an example hydrodynamic separator with a helical liquid channel.

Instead of being described in terms of the length of the linear focusing region $L_f$, the linear focusing region can also be described in terms of the focusing angle ($\alpha$), which is the arc measure of the linear focusing region 128 about the central axis x:

$$\alpha \propto \frac{a w^2}{\pi Re D_H^3}$$

or, more specifically, $$\alpha = 265,682 \frac{a w^2}{\pi Re D_H^3} + 45.1$$

which is plotted against experimental data in FIG. 9. As demonstrated, various liquid channels consistent with the technology disclosed herein require a focusing angle of greater than 360 degrees, indicating that full focusing cannot occur with a "simple" hydrodynamic separator, where a "simple" hydrodynamic separator is one where the liquid channel is less than a full revolution about the central axis x. Liquid channels that fully focus particles within one revolution about the central axis x generally have a small width, high Reynolds number, and large hydraulic diameter.

A series of experiments were conducted that measured the actual particle migration length $L_0$ and the particle focusing length $L_f$ of various hydrodynamic systems consistent with the technology disclosed herein. Hydrodynamic separators of varying device heights and widths were created out of PDMS and glass slides using standard methods. Solutions of fluorescently labeled particles were introduced to the hydrodynamic separator channel at known flowrates within the Dean Numbers of 5-25. Images were taken at various location along the hydrodynamic separator using a CMOS camera. Image processing was used to identify particle concentration as a function of channel position and length. The particle focusing length $L_f$ was also calculated in accordance with equations provided above. The results are reflected in Table 1, below.

except where contradictory. The hydrodynamic separator 200 is configured to focus particles that are dispersed in a liquid stream. The hydrodynamic separator 200 is constructed of a substrate 210. The substrate 210 defines a liquid channel 220 having an inlet 222 and an outlet 224. The liquid is configured to flow through the liquid channel 220 of the hydrodynamic separator 200 from the inlet 222 to the outlet 224.

The liquid channel 220 defines a channel length $L_D$ from the inlet 222 to the outlet 224. The liquid channel 220 is generally curved to define an inner radius $R_C$ about a central axis x. As such, the liquid channel 220 extends circumferentially about the central axis x to define a channel arc measure. In the current example, the liquid channel 220 extends about 810° about the central axis x. In the current example, the inner radius $R_C$ is substantially constant along the length of the channel. In the current example, the liquid

TABLE 1

| No. | Experimental $L_0$ (mm) | Experimental $L_f$ (mm) | Experimental (Lo/(Lo + Lf)) | Lo/Lf | $L_f = 156.2 \dfrac{R_c}{Re}\left(\dfrac{w}{D_H}\right)^2 + 24.3$ | $L_f = 1598.8 \dfrac{R_c a w^2}{Re D_H^3} + 6.4$ |
|---|---|---|---|---|---|---|
| 1 | 13 | 381 | 3.30% | 3.4% | 395 | 370 |
| 2 | 0 | 87 | 0% | 0% | 82 | 110 |
| 3 | 13.5 | 140 | 8.70% | 9.6% | 145 | 148 |
| 4 | 16.5 | 138 | 10.70% | 12.0% | 105 | 101 |
| 5 | 20.7 | 286 | 6.70% | 7.2% | 271 | 297 |
| 6 | 5.9 | 58 | 9.10% | 10.2% | 62 | 69 |
| 7 | 19.4 | 68 | 22.30% | 28.5% | 50 | 48 |
| 8 | 7 | 222 | 3.10% | 3.2% | 161 | 188 |
| 9 | 16.5 | 133 | 11.00% | 12.4% | 136 | 155 |
| 10 | 5.2 | 133 | 3.80% | 3.9% | 99 | 105 |
| 11 | 18.9 | 65 | 22.50% | 29.1% | 77 | 76 |
| 12 | 12.6 | 61 | 17.20% | 20.7% | 64 | 59 |
| 13 | 16.9 | 62 | 21.50% | 27.3% | 103 | 76 |
| 14 | 18.5 | 47 | 28.20% | 39.4% | 77 | 53 |
| 15 | 12.6 | 44 | 22.30% | 28.6% | 64 | 41 |
| 16 | 30.8 | 138 | 18.30% | 22.3% | 174 | 168 |

Across the experimental results, the particle focusing length $L_f$ was greater than the particle migration length $L_0$. The particle migration length $L_0$ ranged from 0% of the total liquid channel length $L_D$ to 28.2% of the total liquid channel length $L_D$. Furthermore, the particle migration length $L_0$ ranged from 0% of the particle migration length $L_f$ to 39.4% of the particle migration length $L_f$. As such, in some embodiments, liquid channels consistent with the technology disclosed herein will have a liquid channel length $L_D$ that is about equal to the particle migration length $L_f$. In various embodiments, liquid channels consistent with the technology disclosed herein will have a liquid channel length $L_D$ that is greater than the particle migration length $L_f$. Based on the collected data, it appears that, in many embodiments, the liquid channel length $L_D$ is less than 40% greater than the particle migration length $L_f$. The liquid channel length $L_D$ may be less than or equal to 30% greater than the particle migration length $L_f$. The liquid channel length $L_D$ may be less than or equal to 20% greater than the particle migration length $L_f$. In some embodiments the liquid channel length $L_D$ may be from 3% to 20% greater than the particle migration length $L_f$.

Figure 11:
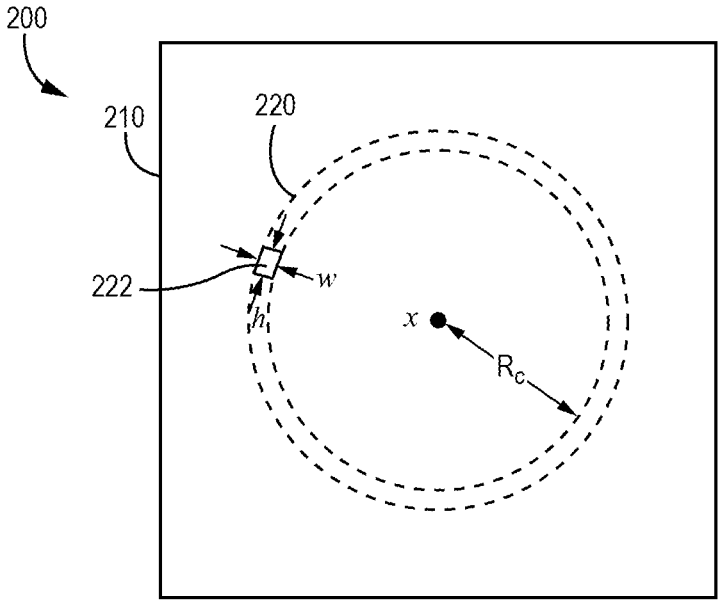
FIG. 11 is a facing view of the example hydrodynamic separator of FIG. 10.

FIGS. 10 and 11 show a schematic view of another example hydrodynamic separator 200 consistent with some embodiments. FIG. 10 is a schematic perspective view and FIG. 11 is a schematic facing view of the inlet side of the hydrodynamic separator, where the liquid channel 220 is represented by dotted lines. The hydrodynamic separator 200 is generally consistent with the descriptions above channel 220 forms a helix about the central axis x. The helical arrangement of the liquid channel 220 accommodates both a constant inner radius $R_C$ and multiple revolutions about the central axis x. In some embodiments, however, the inner radius is not constant.

The liquid channel 220 generally has a rectangular cross-section along the channel length, which is visible in FIG. 11 at the inlet 222. The cross-section of the liquid channel 220 is generally perpendicular to the direction of fluid flow through the channel 220. The channel 220 has a height (h) that is visible in FIG. 2, and a width (w) that is visible in FIG. 11. The channel 220 also has a hydraulic diameter ($D_H$) as has been disclosed.

Similar to examples discussed above, particle focusing can occur in two distinct stages. To optimize the liquid channel length $L_D$, and a fully focused region is avoided so that the entire length of the liquid channel is the particle migration length $L_0$ and the particle focusing length $L_f$. Optimization of the liquid channel length $L_D$ and/or arc measure is generally consistent with the discussion above.

In various embodiments, such as embodiments consistent with the example of FIGS. 1-2 and 10-11, the liquid channel dimensions such as height h, width w, and inner radius $R_C$ are substantially constant along the length of the liquid channel, meaning that such dimensions do not vary beyond 5% of the weighted average value of the dimension along the length of the liquid channel. The equations provided herein are generally for optimization of a liquid channel length where the liquid channel has a substantially constant inner radius $R_C$. In some embodiments, the channel width w is not substantially constant along the length of the channel. In such embodiments, the weighted average of the channel width w along the channel length can be used in the equations provided herein for optimization of the liquid channel length. In various examples, the optimized channel length may be based on the weighted average of the channel dimensions within the focusing region.

Figure 12:
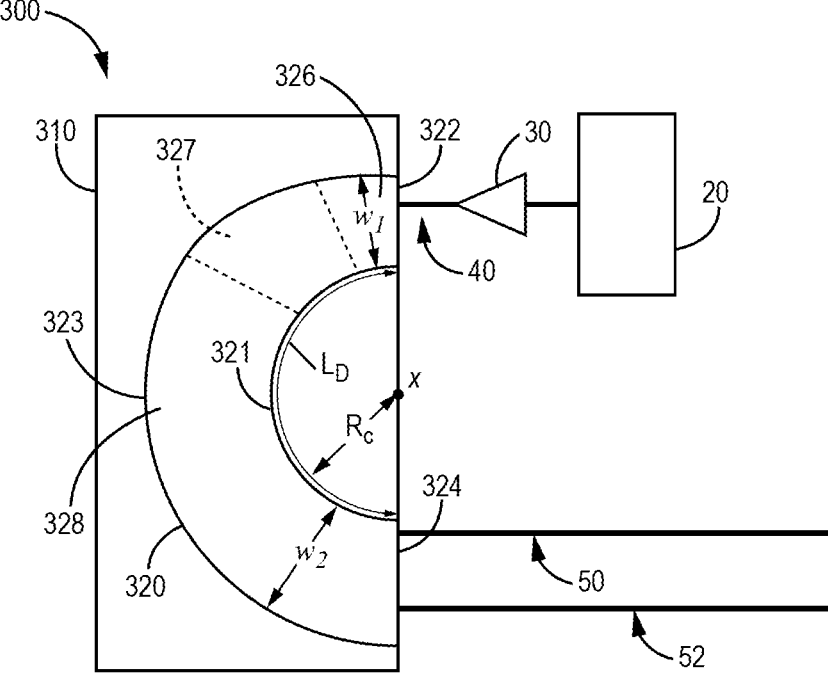
FIG. 12 is another example system consistent with embodiments.

FIG. 12 is a schematic representation of yet another example hydrodynamic separator system consistent with some embodiments. The system has a fluid source 20, a pump, an inlet flow channel 40 and outlet flow branches 50, 52 as discussed above with reference to FIG. 1. The system has a hydrodynamic separator 300 is generally consistent with the descriptions above except where contradictory. The hydrodynamic separator 300 is configured to focus particles that are dispersed in a liquid stream. The hydrodynamic separator 300 is constructed of a substrate 310. The substrate 310 defines a liquid channel 320 having an inlet 322 and an outlet 324. The liquid is configured to flow through the liquid channel 320 of the hydrodynamic separator 300 from the inlet 322 to the outlet 324.

The liquid channel 320 defines a channel length $L_D$ from the inlet 322 to the outlet 324. The liquid channel 320 is generally curved to define an inner radius $R_C$ about a central axis x. As such, the liquid channel 320 extends circumferentially about the central axis x to define a channel arc measure. In the current example, the liquid channel 320 extend s about 180° about the central axis x. In the current example, the inner radius $R_C$ is substantially constant along the length of the channel, but in some other embodiments the inner radius is not constant.

The liquid channel 320 generally has a rectangular cross-section along the channel length, which is not currently visible. The liquid channel 320 has a height (h) that is not currently visible, and a first channel width $w_1$ and a second channel width $w_2$ that is visible in FIG. 12. In this particular example, the liquid channel 320 does not have a constant width. The channel width tapers between the inlet and the outlet. Specifically, a first region 326 of the liquid channel 320 defines a first width $w_1$, a second region 328 of the liquid channel 320 defines a second width $w_2$, and a tapered region 327 extends between the first width $w_1$ and the second width $w_2$ to provide a smooth transition from the first width $w_1$ to the second width $w_2$. The word "taper" is used herein to mean a relatively gradual expansion/contraction that excludes an abrupt transition, such as a stepped transition, between the first width $w_1$ and the second width $w_2$. The taper can be linear, parabolic, or exponential, as examples. Other taper shapes are additionally possible, including combinations of tapered shapes along the length of the tapered region.

In some embodiments the first region 326 and the second region 328 can have about equal lengths, but in the current embodiment the first region 326 is shorter than the second region 328. In some embodiments the first region 326 has a larger length than the second region 328. In some embodiments the tapered region 327 is longer than one or both of the first region 326 or second region 328. In the current example, only the radius of the outer wall 323 of the liquid channel 320 tapers between first region 326 and the second region 328. In some other embodiments, the radius of the outer wall 323 and the radius of the inner wall 321 taper between the first region 326 and the second region 328. In yet other embodiments, only the radius of the inner wall 321 tapers between the first region 326 and the second region 328.

Embodiments of liquid channels where the width tapers from a smaller width to a larger width may be desirable in some implementations. The smaller the width of a liquid channel 320, the shorter the pathway for particles to focus towards the inner wall 321. The larger the width of a liquid channel 320, the lower the pressure drop along the channel 320, which reduces the energy needed to pump liquid through the channel 320. As such, it may be desirable in some implementations to have a liquid channel width that increases along at least a portion of the length of the liquid channel 320.

In some implementations, the optimal channel length can be approximated by using the weighted average of the width along the length of the liquid channel 320 in such calculations. In some implementations consistent with FIG. 12, to achieve maximum focusing, the following is true:

$$1 \leq \frac{L_{w1}}{L_{f(w1)}} + \frac{L_{w2}}{L_{f(w2)}}$$

where $L_{w1}$ and $L_{w2}$ are the actual lengths of the first region 326 (having the first width $w_1$) and the second region 328 (having the second width $w_2$) of the channel, respectively. $L_{f(w1)}$ and $L_{f(w2)}$ are the theoretical linear focusing lengths of a channel consistent with the first region 326 and a channel consistent with the second region 328, respectively. In the case that the length of the tapering region 327 is relatively small relative to $L_{w1}$ and $L_{w2}$ the linear focusing length ($L_f$) would be the following:

$$L_f = \alpha L_{f(w1)} + (1-\alpha)L_{f(w2)}$$

Where $$\alpha = \frac{L_{w1}}{L_{f(w1)}}$$

and corresponds to the percent of focusing that occurs within the first region 326 and where $$(1-\alpha) = \frac{L_{w2}}{L_{f(w2)}}$$

and corresponds to the percent of additional focusing that occurs within the second region 328. By "relatively small" it is meant that the tapering region 327 is less than 30%, 20%, or even less than 10% of the combined length of the first region 326 and the second region 328.

In some other implementations, for purposes of calculating the total length of the focusing region, a first portion of the tapered region may be considered part of the length of the first region 326 and a second portion of the tapered region may be considered part of the length of the second region 328. For example, half of the length of tapered 327 region may be considered part of the length of the first region 326 and the other half of the length of the tapered region 327 may be considered part of the length of the second region 328. Other approaches may also be used.

EXAMPLES

Example A (25 μm Particles in Water)

A hydrodynamic separator is designed to focus 25 μm particles in water. Key parameters are in Table 2. The flowrate range at which particles focus is approximately 1.3 mL/min to 6.5 mL/min (Dean Number=5.1 to 25.3). The linear focusing region length is calculated for these flowrates as shown in Table 3. The system pressure drop is an estimated pressure drop based on straight channel calculations and does not include minor losses or effects of secondary flows.

TABLE 2

| | |
|---|---|
| Fluid Density (g/mL) | 0.998 |
| Channel Height (μm) | 150 |
| Channel Width (μm) | 500 |
| Hydraulic Dimension (μm) | 231 |
| Viscosity (cP) | 1 |
| Radius of Curvature (mm) | 20 |
| Particle Confinement | 0.11 |

TABLE 3

| | | $156.2\dfrac{R_c}{Re}\left(\dfrac{w}{D_H}\right)^2 + 24.3$ | | $1598.8\dfrac{R_c aw^2}{ReD_H^3} + 6.4$ | |
|---|---|---|---|---|---|
| Flow Rate (mL/min) | Dean Number (De) | $L_f$ (mm) | System Pressure Drop (mbar) | $L_f$ (mm) | System Pressure Drop (mbar) |
| 0.95 | 5.1 | 245 | 415 | 250 | 423 |
| 1.90 | 10.1 | 135 | 456 | 128 | 434 |
| 2.85 | 15.2 | 98 | 498 | 87 | 442 |
| 3.80 | 20.2 | 79 | 535 | 67 | 448 |
| 4.75 | 25.3 | 68 | 575 | 55 | 465 |

Example B (10 μm Particles in Fuel, Varying Radius of Curvature)

A hydrodynamic separator is designed to focus 10 μm particles in a fluid. Key parameters are in Table 4. The linear focusing region length and estimated pressure drop can be calculated for different hydrodynamic separator radii at a constant Dean Number (De=10). This data is shown in Table 5. The system pressure drop is an estimated pressure drop based on straight channel calculations and does not include minor losses or effects of secondary flows. At larger radii of curvatures the flowrate through the channel increases, but at the drawback of increased pressure drop.

TABLE 4

| | |
|---|---|
| Fluid Density (g/mL) | 0.85 |
| Channel Height (μm) | 100 |
| Channel Width (μm) | 150 |
| Hydraulic Dimension (μm) | 120 |
| Viscosity (cP) | 3 |
| Particle Confinement | 0.08 |

TABLE 5

| | | | | $156.2\dfrac{R_c}{Re}\left(\dfrac{w}{D_H}\right)^2 + 24.3$ | | $1598.8\dfrac{R_c aw^2}{ReD_H^3} + 6.4$ | |
|---|---|---|---|---|---|---|---|
| Radius of Curvature (mm) | Flow Rate (mL/min) | Dean Number | $L_f$ (mm) | System Pressure Drop (mbar) | $L_f$ (mm) | System Pressure Drop (mbar) |
| 10 | 3.4 | 10 | 43.3 | 10633 | 21.6 | 5304 |
| 20 | 4.8 | 10 | 51.2 | 17749 | 28.4 | 9828 |
| 30 | 5.9 | 10 | 57.1 | 24331 | 33.4 | 14228 |
| 40 | 6.8 | 10 | 62.3 | 30596 | 37.8 | 18570 |

Example C (8-12 μm Particles in Wine)

A hydrodynamic separator is designed to focus 8-12 μm particles in wine. This represents the process of removing yeast from beer or wine during clarification. Key parameters are in Table 6. The linear focusing region length is calculated for different flowrates as shown in Table 7. The largest particle size (12 μm) is used for this calculation. The system pressure drop is an estimated pressure drop based on straight channel calculations and does not include minor losses or effects of secondary flows.

TABLE 6

| | |
|---|---|
| Fluid Density (g/mL) | 1.05 |
| Channel Height (μm) | 75 |
| Channel Width (μm) | 150 |
| Hydraulic Dimension (μm) | 100 |
| Fluid Viscosity (cP) | 1.8 |
| Radius of Curvature (mm) | 20 |
| Particle Confinement (8 μm) | 0.08 |
| Particle Confinement (12 μm) | 0.12 |

TABLE 7

| | | $156.2\dfrac{R_c}{Re}\left(\dfrac{w}{D_H}\right)^2 + 24.3$ | | $1598.8\dfrac{R_c aw^2}{ReD_H^3} + 6.4$ | |
|---|---|---|---|---|---|
| Flow Rate (mL/min) | Dean Number (De) | $L_f$ (mm) | System Pressure Drop (mbar) | $L_f$ (mm) | System Pressure Drop (mbar) |
| 1.16 | 5 | 94 | 9070 | 63 | 6040 |
| 2.32 | 10 | 59 | 11390 | 49 | 9300 |
| 3.48 | 15 | 48 | 13900 | 34 | 9940 |
| 4.64 | 20 | 42 | 16210 | 27 | 10440 |

Example D (Device with Two Widths)

A hydrodynamic separator is configured to focus 8-12 μm particles in wine. In some implementations, such a separator can be used to remove yeast from beer or wine during clarification. The hydrodynamic separator has two regions of different widths, $w_1$ and $w_2$ and a relatively small transition region having a length of 1 mm or less. The flow rate is 3.48 mL/min. Key parameters are in Table 8. The separator is configured to accomplish α % of the focusing in the first region, and (1−α) % of the focusing in the second region, such that particles are fully focused at the end of the second region. The length of each region, $L_{w1}$ and $L_{w2}$, and the total focusing length, $L_f$ are calculated in Table 9.

TABLE 8

| | |
|---|---|
| Fluid Density (g/mL) | 1.05 |
| Fluid Flowrate (mL/min) | 3.48 |
| Channel Height (μm) | 75 |
| Channel Width Region 1 (μm) | 100 |
| Channel Width Region 2 (μm) | 150 |
| Hydraulic Dimension Region 1 (μm) | 86 |
| Hydraulic Dimension Region 2 (μm) | 100 |
| Fluid Viscosity (cP) | 1.8 |
| Radius of Curvature (mm) | 20 |
| Particle Confinement Region 1 (8 μm) | 0.09 |
| Particle Confinement Region 1 (12 μm) | 0.14 |
| Particle Confinement Region 2 (8 μm) | 0.08 |
| Particle Confinement Region 2 (12 μm) | 0.12 |

TABLE 9

| Region 1 focusing ($\alpha$) | Region 2 focusing ($1 - \alpha$) | $156.2\dfrac{R_c}{Re}\left(\dfrac{w}{D_H}\right)^2 + 24.3$ | | | $1598.8\dfrac{R_c a w^2}{ReD_H^3} + 6.4$ | | |
|---|---|---|---|---|---|---|---|
| | | $L_{w1}$ (mm) | $L_{w2}$ (mm) | $L_f$ (mm) | $L_{w1}$ (mm) | $L_{w2}$ (mm) | $L_f$ (mm) |
| 0% | 100% | 0 | 48 | 48 | 0 | 34 | 34 |
| 25% | 75% | 9 | 36 | 45 | 5 | 26 | 31 |
| 50% | 50% | 18 | 24 | 42 | 11 | 17 | 28 |
| 75% | 25% | 26 | 12 | 38 | 16 | 9 | 25 |
| 100% | 0% | 35 | 0 | 35 | 21 | 0 | 21 |

While it can generally be observed that by increasing the percentage of focusing in the narrower channel (region 1) that the overall focusing length can be decreased, this will come at the expense of increased pressure drop due to the smaller channel dimensions. An optimal design will depend on application requirements.

EXEMPLARY EMBODIMENTS

Embodiment 1. A hydrodynamic separator configured to separate a liquid having dispersed particles having a diameter (a) comprising:
 a substrate;
 a liquid channel defined by the substrate, the liquid channel configured to receive a liquid having a Reynolds number (Re) within the channel, the liquid channel having an inlet and an outlet, wherein:
 the liquid channel is curved to define an inner radius ($R_C$) and has a liquid channel length ($L_D$) along the curve,
 the liquid channel has a rectangular cross-section along the length of the curve,
 the rectangular cross-section has a height, a width (w), and a hydraulic diameter ($D_H$),
 the liquid channel length ($L_D$) greater than or equal to a linear focusing length ($L_f$), and $$L_f = 1598.8\frac{R_c a w^2}{ReD_H^3} + 6.4.$$

Embodiment 2. The hydrodynamic separator of any one of embodiments 1 and 3-9, wherein the system is configured to have a Dean Number (De) between 5 and 25.

Embodiment 3. The hydrodynamic separator of any one of embodiments 1-2 and 4-9, wherein the particle diameter (a) is greater than 8% of the hydraulic diameter ($D_H$).

Embodiment 4. The hydrodynamic separator of any one of embodiments 1-3 and 5-9, wherein the liquid channel length ($L_D$) is no greater than 40% more than the linear focusing length ($L_f$).

Embodiment 5. The hydrodynamic separator of any one of embodiments 1-4 and 6-9, wherein the liquid channel length ($L_D$) is no greater than 30% more than the linear focusing length ($L_f$).

Embodiment 6. The hydrodynamic separator of any one of embodiments 1-5 and 7-9, wherein the particles are up to three times as dense as the liquid.

Embodiment 7. The hydrodynamic separator of any one of embodiments 1-6 and 8-9, wherein the outlet comprises a first outlet and a second outlet.

Embodiment 8. The hydrodynamic separator of any one of embodiments 1-7 and 9, wherein the liquid channel is one of a plurality of identical liquid channels.

Embodiment 9. The hydrodynamic separator of any one of embodiments 1-8, wherein the liquid channel has a first region having a first channel width and a second region having a second channel width, and a tapered region extending from the first channel width to the second channel width.

Embodiment 10. A hydrodynamic separator configured to separate a liquid having dispersed particles comprising:
 a substrate;
 a liquid channel defined by the substrate, the liquid channel configured to receive a liquid having a Reynolds number (Re) within the channel, the liquid channel having an inlet and an outlet, wherein:
 the liquid channel is curved to define an inner radius ($R_C$) and has a liquid channel length ($L_D$) along the curve,
 the liquid channel has a rectangular cross-section along the length of the curve,
 the rectangular cross-section has a height, a width (w), and a hydraulic diameter ($D_H$),
 the liquid channel length ($L_D$) is greater than or equal to a linear focusing length ($L_f$), and $$L_f = 6.2\frac{R_c}{Re}\left(\frac{w}{D_H}\right)^2 + 24.3.$$

Embodiment 11. The hydrodynamic separator of any one of embodiments 10 and 12-18, wherein the system is configured to have a Dean Number (De) between 5 and 25.

Embodiment 12. The hydrodynamic separator of any one of embodiments 10-11 and 13-18, wherein the particle diameter (a) is greater than 8% of the hydraulic diameter ($D_H$).

Embodiment 13. The hydrodynamic separator of any one of embodiments 10-12 and 14-18, wherein the liquid channel length ($L_D$) is no greater than 40% more than the linear focusing length ($L_f$).

Embodiment 14. The hydrodynamic separator of any one of embodiments 10-13 and 15-18, wherein the liquid channel length ($L_D$) is no greater than 30% more than the linear focusing length ($L_f$).

Embodiment 15. The hydrodynamic separator of any one of embodiments 10-14 and 16-18, wherein the particles are up to three times as dense as the liquid.

Embodiment 16. The hydrodynamic separator of any one of embodiments 10-15 and 17-18, wherein the outlet comprises a first outlet and a second outlet.

Embodiment 17. The hydrodynamic separator of any one of embodiments 10-16 and 18, wherein the liquid channel is one of a plurality of identical liquid channels.

Embodiment 18. The hydrodynamic separator of any one of embodiments 10-17, wherein the liquid channel has a first region having a first channel width and a second region having a second channel width, and a tapered region extending from the first channel width to the second channel width.

Embodiment 19. A hydrodynamic separator configured to separate a liquid having dispersed particles comprising:
a substrate;
a liquid channel defined by the substrate, the liquid channel configured to receive a liquid having a Reynolds number (Re) within the channel, the liquid channel having an inlet and an outlet, wherein:
the liquid channel is curved to define an inner radius ($R_C$) and has a liquid channel length ($L_D$) along the curve,
the liquid channel has a rectangular cross-section along the length of the curve,
the rectangular cross-section has a height, a width (w), and a hydraulic diameter ($D_H$),
the liquid channel length ($L_D$) is greater than or equal to a linear focusing length ($L_f$), and $$L_f = \frac{Rew^2}{8D_H} + 24.3.$$

Embodiment 20. The hydrodynamic separator of any one of embodiments 19 and 21-27, wherein the system is configured to have a Dean Number (De) between 5 and 25.

Embodiment 21. The hydrodynamic separator of any one of embodiments 19-20 and 22-27, wherein the particle diameter (a) is greater than 8% of the hydraulic diameter ($D_H$).

Embodiment 22. The hydrodynamic separator of any one of embodiments 19-21 and 23-27, wherein the liquid channel length ($L_D$) is no greater than 40% more than the linear focusing length ($L_f$).

Embodiment 23. The hydrodynamic separator of any one of embodiments 19-22 and 24-27, wherein the liquid channel length ($L_D$) is no greater than 30% more than the linear focusing length ($L_f$).

Embodiment 24. The hydrodynamic separator of any one of embodiments 19-23 and 25-27, wherein the particles are up to three times as dense as the liquid.

Embodiment 25. The hydrodynamic separator of any one of embodiments 19-24 and 26-27, wherein the outlet comprises a first outlet and a second outlet.

Embodiment 26. The hydrodynamic separator of any one of embodiments 19-25 and 27, wherein the liquid channel is one of a plurality of identical liquid channels.

Embodiment 27. The hydrodynamic separator of any one of embodiments 19-26, wherein the liquid channel has a first region having a first channel width and a second region having a second channel width, and a tapered region extending from the first channel width to the second channel width.

Embodiment 28. A hydrodynamic separator configured to separate a liquid having dispersed particles having a particle diameter (a) comprising:
a substrate;
a liquid channel defined by the substrate, the liquid channel configured to receive a liquid having a Reynolds number (Re) within the channel, the liquid channel having an inlet and an outlet, wherein:

the liquid channel is curved to define an inner radius ($R_C$) and has a liquid channel length ($L_D$) along the curve about a central axis,
the liquid channel has a rectangular cross-section along the length of the curve,
the rectangular cross-section has a height, a width (w), and a hydraulic diameter ($D_H$),
the liquid channel has a focusing angle ($\alpha$) about the central axis, wherein the focusing angle $$\alpha = 265{,}682 \frac{aw^2}{\pi ReD_H^3} + 45.1,$$

and the liquid channel extends circumferentially about the central axis to an arc measure greater than or equal to the focusing angle $\alpha$.

Embodiment 29. The hydrodynamic separator of any one of embodiments 28 and 30-37, wherein the system is configured to have a Dean Number (De) between 5 and 25.

Embodiment 30. The hydrodynamic separator of any one of embodiments 28-29 and 31-37, wherein the particle diameter (a) is greater than 8% of the hydraulic diameter ($D_H$).

Embodiment 31. The hydrodynamic separator of any one of embodiments 28-30 and 32-37, wherein the arc measure is no greater than 40% more than the focusing angle.

Embodiment 32. The hydrodynamic separator of any one of embodiments 28-31 and 33-37, wherein the arc measure is greater than 360 degrees, and the liquid channel defines a helix.

Embodiment 33. The hydrodynamic separator of any one of embodiments 28-32 and 34-37, wherein the arc measure is less than 360 degrees.

Embodiment 34. The hydrodynamic separator of any one of embodiments 28-33 and 35-37, wherein the particles are up to three times as dense as the liquid.

Embodiment 35. The hydrodynamic separator of any one of embodiments 28-34 and 36-37, wherein the outlet comprises a first outlet and a second outlet.

Embodiment 36. The hydrodynamic separator of any one of embodiments 28-35 and 37, wherein the liquid channel is one of a plurality of identical liquid channels.

Embodiment 37. The hydrodynamic separator of any one of embodiments 28-36, wherein the liquid channel has a first region having a first channel width and a second region having a second channel width, and a tapered region extending from the first channel width to the second channel width.

Embodiment 38. A hydrodynamic separator configured to separate a liquid having dispersed particles having a diameter (a), comprising:
a substrate;
a liquid channel defined by the substrate, the liquid channel configured to receive a liquid having a Reynolds number (Re) within the channel, the liquid channel having an inlet and an outlet, wherein:
the liquid channel has a curved inner wall defining an inner radius ($R_C$) and a curved outer wall defining an outer radius,
the liquid channel has a liquid channel length ($L_D$) along the curved inner wall,
the liquid channel has a rectangular cross-section along the liquid channel length, and
the rectangular cross-section has a channel width (w) between the inner wall and outer wall, where the channel has a tapered region where the channel width tapers between the inlet and the outlet.

Embodiment 39. The hydrodynamic separator of any one of embodiments 38 and 40-50, wherein the channel width increases towards the outlet.

Embodiment 40. The hydrodynamic separator of any one of embodiments 38-39 and 41-50, wherein the channel width increases at a constant rate between the inlet and the outlet.

Embodiment 41. The hydrodynamic separator of any one of embodiments 38-40 and 42-50, wherein the width decreases towards the outlet.

Embodiment 42. The hydrodynamic separator of any one of embodiments 38-41 and 43-50, wherein the inner radius is constant from the inlet to the outlet.

Embodiment 43. The hydrodynamic separator of any one of embodiments 38-42 and 44-50, wherein the outer radius tapers outward between the inlet and the outlet.

Embodiment 44. The hydrodynamic separator of any one of embodiments 38-43 and 45-50, wherein the liquid channel has a first region having a first channel width and a first liquid channel length, a second region having a second channel width and a second liquid channel length, and the tapered region having a tapered region length that extends from the first region to the second region.

Embodiment 45. The hydrodynamic separator of embodiment 44, wherein the first region has a larger length than the second region.

Embodiment 46. The hydrodynamic separator of any one of embodiments 38-45 and 47-50, wherein the system is configured to have a Dean Number (De) between 5 and 25 in the first region and the second region.

Embodiment 47. The hydrodynamic separator of any one of embodiments 38-46 and 48-50, wherein the particles are up to three times as dense as the liquid.

Embodiment 48. The hydrodynamic separator of any one of embodiments 38-47 and 49-50, wherein the outlet comprises a first outlet and a second outlet.

Embodiment 49. The hydrodynamic separator of any one of embodiments 38-48 and 50, wherein the liquid channel is one of a plurality of identical liquid channels.

Embodiment 50. The hydrodynamic separator of any one of embodiments 38-49, wherein the particle diameter (a) is greater than 8% of the hydraulic diameter ($D_H$) of the first region and the hydraulic diameter of the second region.

It should also be noted that, as used in this specification and the appended claims, the phrase "configured" describes a system, apparatus, or other structure that is constructed to perform a particular task or adopt a particular configuration. The word "configured" can be used interchangeably with similar words such as "arranged", "constructed", "manufactured", and the like.

All publications and patent applications in this specification are indicative of the level of ordinary skill in the art to which this technology pertains. All publications and patent applications are herein incorporated by reference to the same extent as if each individual publication or patent application was specifically and individually indicated by reference. In the event that any inconsistency exists between the disclosure of the present application and the disclosure(s) of any document incorporated herein by reference, the disclosure of the present application shall govern.

This application is intended to cover adaptations or variations of the present subject matter. It is to be understood that the above description is intended to be illustrative, and not restrictive, and the claims are not limited to the illustrative embodiments as set forth herein.

What is claimed is:

1. A hydrodynamic separator configured to separate a liquid having dispersed particles having a diameter (a) (μm) comprising:
a substrate;
a liquid channel defined by the substrate, the liquid channel configured to receive a liquid having a Reynolds number (Re) within the channel, the liquid channel having an inlet and an outlet, wherein:
the liquid channel is curved to define an inner radius ($R_C$) (mm) and has a liquid channel length ($L_D$) (mm) along the curve,
the liquid channel has a rectangular cross-section along the length of the curve,
the rectangular cross-section has a height (h) (μm), a width (w) (μm) that increases or decreases towards the outlet, and a hydraulic diameter ($D_H$) (μm),
the liquid channel length ($L_D$) (mm) greater than or equal to a linear focusing length ($L_f$), and $$L_f = 1598.8\frac{R_c aw^2}{ReD_H^3} + 6.4,$$

when measured under conditions where the Reynolds number (Re) is less than 1000, a Dean Number (De) is between 5 and 25, and the diameter (a) is greater than 8% of the hydraulic diameter ($D_H$) and less than 50% of the height (h).

2. The hydrodynamic separator of claim 1, wherein the liquid channel length ($L_D$) is no greater than 30% more than the linear focusing length ($L_f$).

3. The hydrodynamic separator of claim 1, wherein the particles are up to three times as dense as the liquid.

4. The hydrodynamic separator of claim 1, wherein the outlet comprises a first outlet and a second outlet.

5. A hydrodynamic separator configured to separate a liquid having dispersed particles comprising:
a substrate;
a liquid channel defined by the substrate, the liquid channel configured to receive a liquid having a Reynolds number (Re) within the channel, the liquid channel having an inlet and an outlet,
wherein:
the liquid channel is curved to define an inner radius ($R_C$) (mm) and has a liquid channel length ($L_D$) (mm) along the curve,
the liquid channel has a rectangular cross-section along the length of the curve,
the rectangular cross-section has a height (h) (μm), a width (w) (μm) that increases or decreases towards the outlet, and a hydraulic diameter ($D_H$) (μm), the liquid channel length ($L_D$) (mm) is greater than or equal to a linear focusing length ($L_f$), and $$L_f = \frac{Rew^2}{8D_H} + 24.3,$$

when measured under conditions where the Reynolds number (Re) is less than 1000, a Dean Number (De) is between 5 and 25, and the diameter (a) is greater than 8% of the hydraulic diameter ($D_H$) and less than 50% of the height (h).

6. The hydrodynamic separator of claim 5, wherein the liquid channel length ($L_D$) is no greater than 40% more than the linear focusing length ($L_f$).

7. The hydrodynamic separator of claim 5, wherein the particles are up to three times as dense as the liquid.

8. The hydrodynamic separator of claim 5, wherein the outlet comprises a first outlet and a second outlet.

9. A hydrodynamic separator configured to separate a liquid having dispersed particles having a diameter (a), comprising:

a substrate;

a liquid channel defined by the substrate, the liquid channel configured to receive a liquid having a Reynolds number (Re) within the channel, the liquid channel having an inlet and an outlet, wherein:

the liquid channel has a curved inner wall defining an inner radius ($R_C$) and a curved outer wall defining an outer radius, wherein the inner radius is constant from the inlet to the outlet, the liquid channel has a liquid channel length ($L_D$) along the curved inner wall, the liquid channel has a rectangular cross-section along the liquid channel length, and the rectangular cross-section has a channel width (w) between the inner wall and outer wall, where the channel has a tapered region where the channel width tapers between the inlet and the outlet.

10. The hydrodynamic separator of claim 9, wherein the width increases towards the outlet.

11. The hydrodynamic separator of claim 9, wherein the channel width increases at a constant rate between the inlet and the outlet.

12. The hydrodynamic separator of claim 9, wherein the width decreases towards the outlet.

13. The hydrodynamic separator of claim 9, wherein the outer radius tapers outward between the inlet and the outlet.

14. The hydrodynamic separator of claim 9, wherein the liquid channel has a first region having a first channel width and a first liquid channel length, a second region having a second channel width and a second liquid channel length, and the tapered region having a tapered region length that extends from the first region to the second region.

15. The hydrodynamic separator of claim 14, wherein the first region has a larger length than the second region.

* * * * *